United States Patent [19]

Shimizu et al.

[11] 4,448,814
[45] May 15, 1984

[54] METHOD OF FORMING FILM

[75] Inventors: Chiyuki Shimizu; Nobuo Nakamura, both of Ota, Japan

[73] Assignee: General Electric Company, Waterford, N.Y.

[21] Appl. No.: 334,013

[22] Filed: Dec. 23, 1981

[30] Foreign Application Priority Data

Dec. 17, 1980 [JP]  Japan ................... 55-178449

[51] Int. Cl.³ .................. B05D 3/02; C08G 77/04
[52] U.S. Cl. .................. 427/387; 427/393.5; 528/33; 528/34
[58] Field of Search ............. 427/387, 393.5; 428/447; 528/33, 34

[56] References Cited

U.S. PATENT DOCUMENTS 4,220,748  9/1980  Hashimoto et al. ............. 528/33 X
4,332,844  6/1982  Hamada et al. ................ 427/387

*Primary Examiner*—Michael R. Lusignan

[57] ABSTRACT

There is provided a method of forming a stainproof film on silicone elastomers comprised of coating a surface with a combination of an aminoxy functional organosilicon compound, a mixture or condensation products, of a benzene soluble polyorganosiloxane and a silanol-terminated polydiorganosiloxane, together with a mixed solvent comprised of a volatile organosilicon compound and a hydrocarbon solvent.

14 Claims, No Drawings

METHOD OF FORMING FILM

BACKGROUND OF THE INVENTION

The present invention relates to a method for forming a stainproof film on the surface of a silicone elastomer, particularly a silicone elastomer which is formed by curing at room temperature.

Polyorganosiloxane compositions which cure to form an elastomer at room temperature are available in a variety of forms.

Such compositions generally consist of polydiorganosiloxanes terminated with silanol groups and, as a crosslinking agent, an organosilicon compound having hydrolyzable groups such as acetoxy groups, alkoxy groups, dialkyl ketoxime groups, dialkyl amino groups, dialkyl aminoxy groups, and N-methylamide groups, etc. bonded to the silicon atom. These compositions are used in the building, automobile, electrical, and other industries.

In the building industry, these compositions are used in a large quantity for sealing the gaps on walls of concrete or aluminum plates and for glazing and bonding glass plates. The compositions used for this application are generally known as silicone sealants. Because of their outstanding properties, e.g. weather resistance, durability, heat resistance, low-temperature resistance, little change in physical properties with temperature, resistance to ozone and ultraviolet rays, good workability, etc., the demand for silicone sealants is increasing for the construction of high-rise buildings. In addition, the above-mentioned compositions have recently found use as a coating material. When applied to building roofs and walls, they form a silicone elastomeric layer which is superior in water-resistance and weather resistance.

The silicone elastomer obtained from the curable compositions has outstanding properties as mentioned above, but it has a disadvantage since the resulting elastomer is often a little sticky after curing. This stickiness and the good dielectric properties of the major constituent, polydiorganosiloxane, tends to attract dust. This disadvantage is enhanced when the composition includes additives in order to improve the flexibility of the silicone elastomer while maintaining its workability. Such additive may be an inactive polysiloxane which does not participate in crosslinking and migrates to the surface of the formed elastomer. The migrated polysiloxane may then entrap dust, making the dust water-repellent. Such water-repellent dust is not washed away by rain, but stays on the elastomer, and tends to make a building look dirty.

For the purpose of preventing such staining, the present inventors proposed a method for forming a stain resistant film in Japanese Patent Application No. 173443/1979. According to this method, the above-mentioned silicone elastomer is coated with a film-forming composition which is obtained by dissolving a benzene-soluble polyorganosiloxane resin containing tri-functional and tetra-functional siloxane units, the mole ratio of the organic groups per silicon atom in the molecule being less than 2, in a mixed solvent of a hydrocarbon solvent and volatile silane or siloxane. After coating, the film-forming composition is dried and cured.

This process provides a uniform, stain-resistant film on the surface of a silicone elastomer, but the resulting film lacks flexibility and toughness. When applied on the sealant joints or coating materials of high-rise buildings which are subject to vibration, stress, and expansion or contraction due to temperature changes of the substrates, this coating film tends to crack, thereby deteriorating the appearance of the building.

The present inventors subsequently found that a stain-resistant film having flexibility and toughness can be obtained from a film-forming composition which is prepared by dissolving a condensation product of polysiloxane consisting of tetrafunctional siloxy units and mono-functional siloxy units and having hydroxyl groups and/or alkoxy groups bonded to the silicon atom and silanol-terminated polydiorganosiloxane, in a mixed solvent consisting of a hydrocarbon solvent and volatile silane or siloxane. This film-forming composition is dried and cured after application to the surface of a silicone elastomer. The film was more resistant to staining than the silicone elastomer itself, but was not completely satisfactory.

In order to overcome the above disadvantages, the present inventors carried out a series of experiments and completed the present invention which relates to a method for forming a stain-resistant film.

SUMMARY OF THE INVENTION

A method for forming a stain-resistant film on silicone elastomers is comprised of the steps of: dissolving (1) 100 parts by weight of an aminoxy group-containing organosilicon compound having on the average more than two organoaminoxy groups per molecule, (2) 10 to 1,000 parts by weight of a mixture or condensation products of:
(A) 100 parts by weight of benzene-soluble polyorganosiloxane consisting substantially of $SiO_2$ units and $(R^1)_3SiO_{1/2}$ units in a ratio of one mole of $SiO_2$ units to 0.4 to 1.0 mole of $(R^1)_3SiO_{1/2}$ units (wherein $R^1$ is the same or different substituted or unsubstituted monovalent hydrocarbon group) and having reactive groups bonded to silicon atoms at a ratio of 0.0004 to 1 unit for one silicon atom, and
(B) 10 to 1,000 parts by weight of silanol-terminated polydiorganosiloxane having a viscosity of 30 to 2,000 cSt at 25° C.; in (3) a mixed solvent consisting essentially of:
(A) a volatile organosilicon compound represented by the molecular formula:

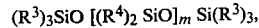

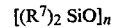

(wherein $R^2$ to $R^7$ are hydrogen or the same or different alkyl groups; m is 0 or a positive number; and n is 3 or a positive number greater than 3; and having a boiling point of 70° to 250° C. under normal pressure; and (B) a hydrocarbon solvent, wherein the quantity of component (3)(A) is more than 5 weight percent of the total quantity of components (1), (3)(A), and (3)(B), such that the total quantity of components (1) and (2) are 5 to 80 weight percent of the total quantity of components (1), (2), and (3); and applying the resulting composition to the surface of a silicone elastomer, followed by drying.

DETAILED DESCRIPTION OF THE INVENTION

The aminoxy group-containing organosilicon compound (1) used in this invention may be a silane derivative or a linear, cyclic, or branched siloxane derivative. The organic groups bonded to the silicon atom include, for example, alkyl groups such as methyl groups, ethyl groups, propyl groups, butyl groups, and hexyl groups; and aryl groups such as phenyl groups. Such organosilicon compounds should contain more than two, preferably more than 2.5 organoaminoxy groups on an average per molecule in order that a stain-resistant film is formed in a short time after application. The organic groups bonded to the aminoxy group include, for example, two monovalent hydrocarbon groups such as methyl groups, ethyl groups, propyl groups, butyl groups, and cyclohexyl groups, and one divalent hydrocarbon group such as butylene groups and pentene groups. Ethyl groups are preferred from the view point of availability of raw materials, ease of synthesis, reactivity, and volatility of released organohydroxylamine. Examples of such aminoxy group-containing organosilicon compounds are listed below. The following symbols are used to represent organosilicon compounds:

Me: Methyl group    Et: Ethyl group    Bu: Butyl group
Vi: Vinyl group     Ph: Phenyl group $Si(ONEt_2)_4$
$MeSi(ONEt_2)_3$
$PhSi(ONMe_2)_3$
$PhSi(ONEt_2)_3$

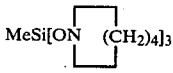

$Et_2NOMe_2SiSiMe_2ONEt_2$
$Et_2NOMe_2SiOSiMe_2ONEt_2$
$Et_2NOMe_2SiOPh_2SiMe_2ONEt_2$

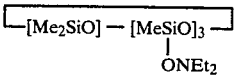

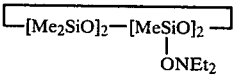

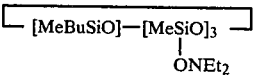

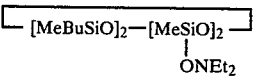

The benzene-soluble polyorganosiloxane of component (2)(A) used in this invention consists of $SiO_2$ units and $(R^1)_3SiO_{1/2}$ units (where $R^1$ is as defined above) and is of low molecular weight. Examples of $R^1$ include alkyl groups such as methyl groups, ethyl groups, propyl groups, butyl groups, amyl groups, hexyl groups, octyl groups, and decyl groups; alkenyl groups such as vinyl groups; aralkyl groups such as beta-phenylethyl groups; aryl groups such as phenyl groups; and their derivatives where the hydrogen atoms are partly substituted by chlorine, fluorine, or nitrile groups. From the standpoint of ease of synthesis, weather resistance, and reactivity with component (B), preferably more than 90 mole percent of $R^1$ should be methyl groups, and most preferably all $R^1$ groups should be methyl groups. The quantity of $(R^1)_3SiO_{1/2}$ units should be 0.4 to 1.0 mole per mole of $SiO_2$ units. If the quantity of $(R)_3SiO_{1/2}$ units is small, it is difficult to produce consistent benzene soluble low-molecular weight products and the composition tends to gel, thereby forming insoluble polymers during synthesis or storage. If $(R^1)_3SiO_{1/2}$ units are present excessively, the reactivity for condensation with silanol-terminated polydiorganosiloxane in component (B) becomes low, and it is difficult to produce a composition that provides a stain-resistant, tough film.

The benzene-soluble polyorganosiloxane (A) should have reactive groups bonded to the silicon atom at a ratio of 0.0004 to 1 reactive groups per silicon atom.

Such reactive groups include hydroxyl groups and alkoxy groups. Such polysiloxane is obtained by cohydrolyzing a tetrafunctional silicon-containing compound including for example, alkyl silicates such as ethyl silicate and propyl silicate and partial condensates thereof; silicon tetrachloride; and water glass, and a triorganochlorosilane such as trimethylchlorosilane, dimethylvinylchlorosilane, and dimethylphenylchlorosilane, in the presence of solvent, followed by removal of by-products by the conventional manner. Solvents used for this purpose include hydrocarbons such as benzene, toluene, xylene, gasoline, n-hexane, and n-heptane.

The silanol-terminated polydiorganosiloxane in component (2) (B) used in this invention is one which has a substantially linear siloxane chain and has a viscosity of 30 to 2,000,000 cSt, preferably 1,000 to 200,000 cSt, at 25° C. If the viscosity is less than 30 cSt, the resulting film lacks toughness and flexibility; and if the viscosity is greater than 2,000,000 cSt, the composition is too viscous to work properly. The organic group bonded to the silicon atom is the same as $R^1$ in component (A), and it is preferable that all $R^1$ groups are methyl groups in view of the balance between the viscosity and the physical properties of the composition, the reactivity of condensation with polysiloxane (A), availability of intermediates on an industrial scale, the curing speed at normal temperature, and UV resistance. However, the organic group may contain up to 20 mole percent of phenyl groups and up to 10 mole percent of vinyl groups, depending on the application and properties required.

The polysiloxane (A) and the silanol-terminated polydiorganosiloxane (B) may be used in the form of a simple mixture or may be condensed previously. Co-condensation may be accomplished by mixing and heating both, preferably in the presence of potassium hydroxide, sodium hydroxide, or organic peroxide. The polysiloxane (A) is usually obtained as a hydrocarbon solution containing 30 to 60 wt% of solids. Solvent may be added as required. Then, the silanol-terminated polydiorganosiloxane (B) is added, and the resulting mixture is heated. The suitable solvent is a hydrocarbon solvent, preferably toluene or xylene. The heating temperature is preferably 80° to 150° C. Refluxing of the solvent may be advantageously used to control the temperature. The condensation reaction may be continued to completion or may be suspended in the state of partial condensation.

Component (A) and component (B) are mixed in the ratio of 100 parts by weight of (A) for 10 to 1,000 parts by weight of (B), preferably 20 to 500 parts by weight of (B). If a greater quantity of (B) is used, the resulting film is poor in stain-resistance, and if less (B) is used, the resulting film lacks flexibility and toughness.

The quantity of component (2) is required in an amount of 10 to 1,000 parts by weight of component (1). If the quantity of component (2) is above the upper limit, the stain-resistance is not sufficient; and if the quantity is less than the lower limit, the resulting film decreases in flexibility and toughness.

Component (3) used in this invention consists of (a) a volatile organosilicon compound and (b) hydrocarbon solvent. This component is necessary to impart wetability to the surface of the silicone elastomer and to accomplish uniform application.

The volatile organosilicon compound of component (a) is a silane or siloxane which contains no unstable groups. Such a compound should have a proper volatility, in other words, have a boiling point from 70° to 250° C. If the boiling point is lower than this limit, the compound volatilizes at an early stage when the compound is applied; and if the boiling point is higher than this limit, the compound volatiles too slowly, delaying the formation of the film. Examples of such volatile organosilicon compounds include silanes such as dimethyldiethylsilane, and trimethylbutylsilane; linear siloxanes such as hexamethyldisiloxane, octamethyltrisiloxane, decamethyltetrasiloxane, and dodecamethylpentasiloxane; branched siloxanes such as 3-trimethylsiloxy-1,1,1,3,7,7,7-heptamethyltrisiloxane; and cyclic siloxanes such as hexamethylcyclotetrasiloxane, octamethylcyclotetrasiloxane, and decamethylcyclopentasiloxane. Preferable among these is methylsiloxane, in view of the ease of synthesis, most preferable among them is octamethylcyclotetrasiloxane which has a proper degree of volatility.

The quantity of component (3)(A) should be more than 5 wt%, preferably more than 10 wt%, based on the total quantity of components (1), (3)(A) and (3)(B). If the quantity of component (3)(A) is lower than this limit, sufficient wetting for the surface of the silicon elastomer is not obtained and a uniform film is not formed due to dewetting and unevenness.

Examples of hydrocarbon solvents of component (3)(B) include benzene, toluene, xylene, n-hexane, n-heptane, cyclohexane, and gasoline. Preferable among them are toluene and xylene on account of their adequate volatility, ability to dissolve the condensate reaction product of component (1), and ease of handling.

The total quantity of components (1) and (2) should be 5 to 80 wt%, preferably 10 to 50 wt%, of the total quantity of components (1), (2), and (3). If the quantity is less than this limit, the film which is formed by a single application is too thin and repeated coating is required for sufficient stain-resistant effect. This decreases working efficiency. If the quantity is more than that limit, the composition becomes too viscous to carry out work efficiently, and forms a film which is too thick and which disturbs the silicone elastomer thereunder from exhibiting its characteristics.

The present invention comprises applying a composition made up of components (1), (2), and (3) to a silicone elastomer, volatilizing components (A) and (B) of component (3), and performing a dehydroxyl-amine curing reaction, thereby forming a film having stain-resistance, toughness, and flexibility on the surface of the silicone elastomer. The silicone elastomer may be either of the room temperature curing type or of the heat curing type. The present invention will be useful in the stain-proofing of building sealants and coating materials where protection of staining with dust is an important problem. Application may be accomplished by any method, e.g., roll coating and spraying.

By virute of its toughness and flexibility, the film obtained according to the method of this invention stays on the sealant applied to building joints and the coating material applied to metal roofs even if they are deformed when buildings are subjected to temperature change, wind pressure, or earthquake. The film obtained according to the method of this invention is very smooth and superior in resistance to staining, but might be stained under extremely adverse conditions. Even in such a case, the film can be cleaned very easily and completely. The composition used in this invention may also include a powder such as silica, titanium oxide, calcium carbonate, carbon black, etc. for coloring, delustering, and/or reinforcement.

The invention will be illustrated by the following examples. "Parts" used in the examples are all "parts by weight." The following symbols are used for brevity.

M: $MeSiO_{\frac{1}{2}}$ units (monofunctional methylsiloxane unit)
D: $Me_2SiO$ units (difunctional methylsiloxane unit)
Q: $SiO_2$ units (tetrafunctional methylsiloxane unit)

REFERENTIAL EXAMPLE 1

A condensate product (abbreviated as S-1) containing 50% solids was prepared by mixing (1) 100 parts of a 50% toluene solution of a resinous polymer consisting of Q units and M units, the ratio of M units to 1 mole of Q units being 0.65 mole, and having hydroxyl groups bonded to the silicon atom, and (2) 100 parts of silanol-terminated polydimethylsiloxane having a viscosity of about 500,000 cSt at 25° C.; adding 0.006 parts of sodium hydroxide; heating and stirring the mixture under toluene reflux until the viscosity reaches 100,000 cSt; neutralizing and filtering the condensate product by the conventional procedure; and finally adding toluene to adjust the solids content to 50%.

REFERENTIAL EXAMPLE 2

A condensate product (S-2) containing 50% solids was prepared in the same manner as for S-1 from (1) 200 parts of a 50% toluene solution of a resinous polymer consisting of Q units and M units, the ratio of M units to 1 mole of Q units being 0.55 mole, and having hydroxyl groups and ethoxy groups bonded to the silicon atoms, and (2) 50 parts of silanol-terminated polydimethylsiloxane having a viscosity of about 70,000 cSt at 25° C.

REFERENTIAL EXAMPLE 3

A condensate product (S-3) containing 50% solids was prepared in the same manner as for S-1 from (1) 200 parts of a 50% toluene solution of the same resinous polymer as used in Referential Example 2, and (2) 50 parts of silanol-terminated polydiorganosiloxane having a viscosity of about 200,000 cSt at 25° C. and consisting of 8 mole % of diphenyl siloxane units and the remainder of dimethylsiloxane units.

REFERENTIAL EXAMPLE 4

A condensate product (S-4) containing 50% solids was prepared in the same manner as for S-1 from (1) 100 parts of a 50% xylene solution of polysiloxane having the molar ratio of 0.53 M units and 1 mole of Q units and having hydroxyl groups bonded to the silicon atoms, and (2) 80 parts of silanol-terminated polydimethylsiloxane having a viscosity of about 1,000,000 cSt at 25° C.

EXAMPLE 1

A base compound was prepared by kneading 100 parts of silanol-terminated polydimethylsiloxane having a viscosity of 20,000 cSt at 25° C., 10 parts of fumed silica surface-treated with octamethylcyclotetrasiloxane, and 100 parts of ground calcium carbonate fine powder. To this compound were added 0.25 parts of dibutyltin dilaurate and then 4 parts of methyl-tris (butanone oxime)silane, and the mixture was kneaded in the absence of moisture. The mixture was dissolved by adding 100 parts of kerosene. The solution was applied to a mild steel sheet measuring 200×200×2 mm, using a brush. After curing at room temperature for 7 days, the film of the silicone elastomer was found to have a thickness of about 0.4 mm.

Test specimens were prepared by applying samples (numbered 11 to 15 in Table 1) to the surface of the silicone elastomer coated on the mild steel sheet. The test specimens were dried and cured at room temperatures. Among above-said samples, sample number 15 is a Comparative Example. The elastomer without surface coating is shown as control.

After curing at room temperature for 14 days, these specimens were measured for resistance to slip as follows: A 150 g cubic weight having a 50×50 mm base, enclosed by a 2-mm thick rough cotton cloth, is placed on the surface of the specimen. The weight is pulled at a rate of 500 mm/min, with the specimen held firmly horizontally. The force required to pull the weight is measured with a spring balance and is recorded as the resistance to slip.

The specimens were then subjected to an outdoor exposure test, with the coated surface upward, in order to observe the resistance to staining. The degree of staining was determined by reading the brightness is terms of Munsell values, before and after wiping the specimen surface with a medical gauze. The results are shown in Table 1. (All tables follow Example 8).

EXAMPLE 2

Test specimens were prepared by applying samples by brush (Nos. 21 to 25 as shown in Table 2) to the surface of the silicone elastomer coated on the steel sheet as in Example 1. After curing at a room temperature for 14 days, the specimens were dented 5 mm on an Erichsen tester to see if cracking occurs. The specimens were also subjected to an outdoor exposure test to observe staining. The degree of staining was determined by reading the brightness of the specimen surface in terms of Munsell values. The results are shown in Table 2. Sample Nos. 24 and 25 are Comparative Examples.

In Table 2, S-5 is a toluene solution which contains 50% solids of a resinous polymer consisting of Q units and M units, the ratio of M units to 1 mole of Q units being 0.65 mole and having hydroxyl groups bonded to silicon atoms.

EXAMPLE 3

Test specimens were prepared by applying samples Nos. 31 to 35 (as shown in Table 3) with a brush to the surface of the silicone elastomer coated on the steel sheet as in Example 1. After curing at a room temperature for 14 days, the specimens were dented 5 mm on an Erichsen tester to see if cracking occurs. The specimens were also subjected to an outdoor exposure test to observe staining. The degree of staining was determined by reading the brightness of the specimen surface in terms of Munsell values. The results are shown in Table 3. Sample Nos. 33 and 34 are Comparative Examples.

EXAMPLE 4

A base compound was prepared by kneading 100 parts of silanol-terminated polydimethylsiloxane having a viscosity of 20,000 cSt at 25° C., 10 parts of fumed silica surface-treated with polydimethylsiloxane, and 5 parts of titanium oxide fine powder. To this compound were added 0.05 parts of dibutyltin diacetate and then 5 parts of condensate of partial hydrolyzate of methyltriacetoxysilane, and the mixture was kneaded in the absence of moisture. The mixture was dissolved by adding 100 parts of xylene. The solution was applied to a glass plate, and dried and cured at room a temperature for 7 days.

Test specimens were prepared by applying samples (Nos. 41 to 48 as shown in Table 4) with a brush to the surface of the silicone elastomer coated on the glass plate, to observe the wetting property. After curing at a room temperature for 7 days, the specimens were subjected to an outdoor exposure test in order to observe the resistance to staining. The results are shown in Table 4. Sample No. 48 is a Comparative Example.

EXAMPLE 5

A base compound was prepared by kneading 100 parts of silanol-terminated polydimethylsiloxane having a viscosity of 5,000 cSt at 25° C. and 65 parts of ground calcium carbonate fine powder. To this compound were added 3.0 parts of crosslinking agent mixture consisting of 93 wt% of

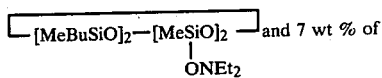 and 7 wt % of

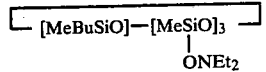

The mixture was dissolved by adding 100 parts of xylene. The solution was applied to a mortar plate, and cured at a room temperature for 7 days.

The specimens were prepared by applying with brush samples, Nos. 51 to 54 as shown in Table 5, to the surface face of the silicone elastomer coated on the mortar plate. After drying and curing at room temperature for 14 days, the specimens were subjected to an outdoor exposure test in order to observe the resistance to staining. The results are shown in Table 5. The control sample was an uncoated specimen of silicone elastomer.

EXAMPLE 6

Test specimens were prepared by applying samples (Nos. 61 to 65 shown in Table 6) to the surface of the silicone elastomer coated on the steel sheet as used in Example 1. As a control, a silicone elastomer sample was not coated.

Incidentally, S-6 to S-8 are described as follows:

S-6: 50% xylene solution of polysiloxane having the ratio of 0.53 moles of M units to 1 mole of Q units, and containing hydroxyl groups bonded to silicon atoms.
S-7: Silanol-terminated polydimethylsiloxane having a viscosity of 700 cSt at 25° C.
S-8: Silanol-terminated polydimethylsiloxane having a viscosity of 80,000 cSt at 25° C.

These specimens were measured for resistance to slip in the same manner as in Example 1. The specimens were also subjected to outdoor exposure test to observe staining. The specimens were also dented 5 mm on an Erichsen tester to see if cracking occurs. The results are shown in Table 6.

EXAMPLE 7

A base compound was prepared by kneading 100 parts of silanol-terminated polydimethylsiloxane having a viscosity of 3,000 cSt at 25° C. and 25 parts of colloidal calcium carbonate fine powder surface-treated with stearic acid. To this compound were added 3.0 parts of crosslinking agent mixture consisting of 96 wt% of

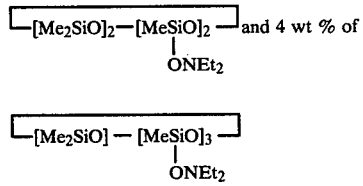

and 4 wt % of

The mixture was applied to the joints, 20 mm wide and 15 mm deep, of G.P.C. walls (precast concrete plate with granite surfacing bonded thereto).

On the next day of application, the silicone elastomer which filled the joints was coated with sample No. 12 in Example 1 and sample No. 62 in Example 6 using a brush.

After about 10 months, the joints were observed. Almost no staining was observed on the joints which had been coated with samples No. 12 and No. 62. Staining was observed not only on uncoated joints but also on the vicinity of joints. The stained parts were found to be water repellent.

EXAMPLE 8

A base compound was prepared by kneading 80 parts of silanol-terminated polydimethylsiloxane having a viscosity of 20,000 cSt at 25° C., 20 parts of trimethylsilyl end-blocked polydimethylsiloxane having a viscosity of 100 cSt at 25° C., 10 parts of fumed silica surface-treated with octamethylcyclotetrasiloxane, 10 parts of titanium oxide fine powder, and 100 parts of ground calcium carbonate fine powder. To this compound were added 0.25 parts of dibutyltin dilaurate, 20 parts of gamma-aminopropyltriethoxysilane, and 5.0 parts of methyl-tris(butanone oxime)silane in the order listed, and the mixture was kneaded in the absence of moisture. The mixture was dissolved by adding 100 parts of kerosene.

The solution was applied using a roller to the external wall of a building. On the following day, the silicone coating was further coated by spraying with the samples No. 13 as used in Example 1 and No. 64 as used in Example 6.

About 6 months after applicaton, the state of staining was observed. Almost no staining was observed on the parts coated with samples No. 13 and No. 64. Severe staining was observed on uncoated parts. Stains on the coated film of samples No. 13 and No. 64 were easily removed when wiped with a cloth. On the other hand, stains on the uncoated parts could not be removed by wiping with a cloth.

TABLE 1

| Specimen No. | Control | 11 | 12 | 13 | 14 | (15) |
|---|---|---|---|---|---|---|
| Composition (parts) | | | | | | |
| ⊢(Me₂SiO)⊣⊢MeSiO⊣<br>          ONEt₂ | — | 100 | 100 | 100 | 100 | — |
| S-1 | — | 50 | 100 | 200 | 400 | 100 |
| Toluene | — | 100 | 125 | 150 | 200 | 25 |
| D₄ | — | 250 | 275 | 350 | 500 | 75 |
| γ-aminopropyl-triethyoxysilane | — | — | — | — | — | 1 |
| Stannous octoate (Sn 28%) | — | — | — | — | — | 0.1 |
| Resistance to slip (g) | 175 | 17 | 22 | 34 | 53 | 101 |
| Staining (Munsell value) | | | | | | |
| Before exposure | N-9.5 | N-9.5 | N-9.5 | N-9.5 | N-9.5 | N-9.5 |
| After 12-month exposure | N-4.0 | N-9.0 | N-9.0 | N-9.0 | N-8.5 | N-7.5 |
| After 12-month exposure and cleaning | N-4.0 | N-9.5 | N-9.5 | N-9.5 | N-9.0 | N-7.5 |

TABLE 2

| Specimen No. | 21 | 22 | 23 | (24) | (25) |
|---|---|---|---|---|---|
| Composition (parts) | | | | | |

TABLE 2-continued

| Specimen No. | 21 | 22 | 23 | (24) | (25) |
|---|---|---|---|---|---|
| $[(Me_2SiO)_{\overline{7}}(MeSiO)_{\overline{3}}]$ with ONEt$_2$ | 100 | 100 | 100 | — | — |
| S-2 | 200 | — | — | 100 | — |
| S-3 | — | 200 | — | — | — |
| S-4 | — | — | 200 | — | — |
| S-5 | — | — | — | — | 100 |
| Toluene | 150 | 150 | 150 | 25 | 25 |
| D$_4$ | 350 | 350 | 350 | 75 | 75 |
| γ-aminopropyl-triethyoxysilane | — | — | — | 1 | 1 |
| Stannous octoate (Sn 28%) | — | — | — | 0.1 | 0.1 |
| Erichsen test (5 mm dent) | OK | OK | OK | OK | Crack |
| Staining (Munsell value) | | | | | |
| Before exposure | N-9.5 | N-9.5 | N-9.5 | N-9.5 | N-9.5 |
| After 12-month exposure | N-9.0 | N-9.0 | N-9.0 | N-7.5 | N-9.0 |
| After 12-month exposure and cleaning | N-9.5 | N-9.5 | N-9.5 | N-7.5 | N-9.0 |

TABLE 3

| Specimen No. | 31 | 32 | (33) | (34) |
|---|---|---|---|---|
| Composition (parts) | | | | |
| $[(MeBuSiO)_{\overline{7}}(MeSiO)_{\overline{3}}]$ with ONEt$_2$ | 100 | — | — | — |
| Me$_2$SiO[Me$_2$SiO]$_{\overline{12}}$[MeSiO]$_{\overline{3}}$SiMe$_3$ with ONEt$_2$ | — | 100 | — | — |
| MeSiO(NO=C(Me)(Et))$_3$ | — | — | 100 | — |
| MeSi(OMe)$_3$ | — | — | — | 100 |
| S-1 | 200 | 200 | 200 | 200 |
| Toluene | 150 | 150 | 150 | 150 |
| D$_4$ | 350 | 350 | 350 | 350 |
| Dibutyltin dilaurate | — | — | 50 | 50 |
| Erichsen test (5 mm dent) | OK | OK | Crack peel | Crack peel |
| Staining (Munsell value) | | | | |
| Before exposure | N-9.5 | N-9.5 | N-9.5 | N-9.5 |
| After 12-month exposure | N-9.0 | N-9.0 | N-6.0 | N-7.5 |
| After 12-month exposure and cleaning | N-9.5 | N-9.5 | N-6.5 | N-7.5 |

TABLE 4

| Specimen No. | 41 | 42 | 43 | 44 | 45 | 46 | 47 | (48) |
|---|---|---|---|---|---|---|---|---|
| Composition (parts) | | | | | | | | |
| $[(Me_2SiO)_{\overline{7}}(MeSiO)_{\overline{3}}]$ with ONEt$_2$ | 100 | 100 | 100 | 100 | 100 | 100 | 100 | 100 |
| S-1 | 200 | 200 | 200 | 200 | 200 | 200 | 200 | 200 |
| M M | 350 | — | — | — | — | — | — | — |
| M D M | — | 350 | — | — | — | — | — | — |
| M D$_2$ M | — | — | 350 | — | — | — | — | — |
| Mixture of D$_3$-D$_5$ *1 | — | — | — | 350 | — | — | — | — |

TABLE 4-continued

| Specimen No. | 41 | 42 | 43 | 44 | 45 | 46 | 47 | (48) |
|---|---|---|---|---|---|---|---|---|
| $D_4$ | — | — | — | — | 500 | 250 | 100 | — |
| Toluene | 150 | 150 | 150 | 150 | — | 250 | 400 | 500 |
| Wetting properties *2 | Good | Good | Good | Good | Good | Good | Fair | Poor |
| Staining (Munsell value) | | | | | | | | |
| Before exposure | N-9.5 | N-9.5 | N-9.5 | N-9.5 | N-9.5 | N-9.5 | N-9.5 | *3 |
| After 12-month exposure | N-9.0 | N-9.0 | N-9.0 | N-9.0 | N-9.0 | N-9.0 | N-9.0 | *4 |

Note:
*1 $D_3$ 10%, $D_4$ 70%, $D_5$ 20%
*2 Good ... Very good wetting with uniform coating.
   Fair ... Good wetting.
   Poor ... Uneven wetting and partially repelling.
*3 Uneven wetting and poor appearance.
*4 Considerable staining at repelled parts, and very poor appearance.

TABLE 5

| Specimen No. | Control | 51 | 52 | 53 | 54 |
|---|---|---|---|---|---|
| Composition (parts) | | | | | |
| $\mathrm{+MeBuSiO+\!+MeSiO+_{\overline{3}}}$ with $\mathrm{ONEt_2}$ | — | 100 | 100 | 100 | 100 |
| S-1 | — | 100 | 100 | 100 | 100 |
| $D_4$ | — | 480 | 280 | 180 | 100 |
| Xylene | — | 570 | 270 | 120 | — |
| Staining (Munsell value) | | | | | |
| Before exposure | N-9.5 | N-9.5 | N-9.5 | N-9.5 | N-9.5 |
| After 12-month exposure | N-3.5 | N-8.5 | N-9.0 | N-9.0 | N-9.0 |
| After 12-month exposure and cleaning | N-3.5 | N-9.0 | N-9.5 | N-9.5 | N-9.5 |

TABLE 6

| Specimen No. | Control | 61 | 62 | 63 | 64 | 65 |
|---|---|---|---|---|---|---|
| Composition (parts) | | | | | | |
| $\mathrm{+Me_2SiO+\!+MeSiO+_{\overline{3}}}$ with $\mathrm{ONEt_2}$ | — | 100 | 100 | 100 | 100 | 100 |
| S-5 | — | 100 | 100 | — | 200 | 50 |
| S-6 | — | — | — | 100 | — | — |
| S-7 | — | 50 | — | — | — | — |
| S-8 | — | — | 50 | 50 | 30 | 100 |
| $D_4$ | — | 350 | 350 | 350 | 400 | 400 |
| Toluene | — | 200 | 200 | 200 | 190 | 250 |
| Resistance to slip (g) | 175 | 24 | 32 | 29 | 18 | 51 |
| Erichsen test (5 mm dent) | — | OK | OK | OK | OK | OK |
| Staining (Munsell value) | | | | | | |
| Before exposure | N-9.5 | N-9.5 | N-9.5 | N-9.5 | N-9.5 | N-9.5 |
| After 12-month exposure | N-4.0 | N-9.0 | N-9.0 | N-9.0 | N-9.0 | N-8.5 |
| After 12-month exposure and cleaning | N-4.0 | N-9.5 | N-9.5 | N-9.5 | N-9.5 | N-9.0 |

We claim:
1. A method for forming a stainproof film which comprises the steps of dissolving:
(1) 100 parts by weight of an aminoxy group-containing organosilicon compound having an average of more than two organoaminoxy groups per molecule,
(2) 10 to 1,000 parts by weight of a mixture or condensation products of:
(A) 100 parts by weight of benzene-soluble polyorganosiloxane consisting substantially of $SiO_2$ units and $(R^1)_3SiO_{\frac{1}{2}}$ units in a ratio of one mole of $SiO_2$ to 0.4 to 1.0 mole of $(R^1)_3SiO_{\frac{1}{2}}$ units wherein $R^1$ is the same or different substituted or unsubstituted monovalent hydrocarbon group and wherein the ratio of reactive groups is 0.0004 to 1 reactive group per silicon atom, and (B) 10 to 1,000 parts by weight of silanol-terminated polydiorganosiloxane having a viscosity of 30 to 2,000,000 cSt at 25° C., in (3) a mixed solvent consisting of:

(A) a volatile organosilicon compound represented by the molecular formula:

$(R^2)_4Si$, $(R^3)_3SiO[(R^4)_2SiO]_mSi(R^3)_3$, $R^5Si[OSi(R^6)_3]_3$, or $[(R^7)_2SiO]_n$ wherein $R^2$ to $R^7$ are hydrogen or the same or different alkyl groups; m is 0 or a positive number; and n is 3 or a positive number greater than 3; and having a boiling point of 70° to 250° C. under normal pressure; and (B) a hydrocarbon solvent, wherein the quantity of component (a) is more than 5 weight percent of the total quantity of components (1), (a), and (b), such that the total quantity of components (1) and (2) are 5 to 80 weight percent of the total quantity of components (1), (2), and (3); and applying the resulting composition to the surface of a silicone elastomer, followed by drying.

2. A method for forming a film as in claim 1, in which component (1) is an aminoxy group-containing organosilicon compound having more than 2.5 organoaminoxy groups on an average per molecule.

3. A method for forming a film as in claim 1, in which the organic group bonded to the aminoxy group in component (1) is an ethyl group.

4. A method for forming a film as in claim 1, in which the reactive group in component (2) (A) is a monovalent group selected from the class consisting of hydroxyl groups and alkoxy groups.

5. A method for forming a film as in claim 1, in which $R^1$ is a methyl group.

6. A method for forming a film as in claim 1, in which the viscosity of component (B) is 1,000 to 200,000 cSt at 25° C.

7. A method for forming a film as in claim 1, in which the organic group bonded to the silicon atoms of component (B) is a methyl group.

8. A method for forming a film as in claim 1, in which component (B) is added in an amount of 20 to 500 parts by weight.

9. A method for forming a film as in claim 1, in which component (2) is added in an amount of 20 to 500 parts by weight.

10. A method for forming a film as in claim 1, in which R to $R^7$ are methyl groups.

11. A method for forming a film as in claim 1, in which the volatile organosilicon compound of component (a) is octamethylcyclotetrasiloxane.

12. A method for forming a film as in claim 1, in which the quantity of component (a) is more than 10 weight percent of the total quantity of components (1), (a), and (b).

13. A method for forming a film as in claim 1, in which the hydrocarbon solvent is an aromatic hydrocarbon selected from the group consisting of toluene and xylene.

14. A method for forming a film as in claim 1, in which the total quantity of components (1) and (2) is 10 to 50 weight percent of the total quantity of components (1), (2), (3).

* * * * *

UNITED STATES PATENT AND TRADEMARK OFFICE
CERTIFICATE OF CORRECTION

PATENT NO. : 4,448,814
DATED : May 15, 1984
INVENTOR(S) : Chiyuki Shimizu et al.

It is certified that error appears in the above-identified patent and that said Letters Patent is hereby corrected as shown below:

On the title page, Item [73] should read

-- Toshiba Silicones Limited, Tokyo, Japan --.

Signed and Sealed this

Twentieth Day of November 1984

[SEAL]

Attest:

GERALD J. MOSSINGHOFF

Attesting Officer

Commissioner of Patents and Trademarks